United States Patent [19]

Komuro

[11] Patent Number: 4,881,321

[45] Date of Patent: Nov. 21, 1989

[54] METHOD AND APPARATUS FOR MAKING A HARNESS

[75] Inventor: Katsumi Komuro, Tokyo, Japan

[73] Assignee: AMP Incorporated, Harrisburg, Pa.

[21] Appl. No.: 345,383

[22] Filed: May 1, 1989

[30] Foreign Application B-142960 ........... 6/10/88

[51] Int. Cl.[4] ........................ H01R 43/04; B23P 19/04

[52] U.S. Cl. ........................................ 29/861; 29/857; 29/749; 29/759

[58] Field of Search .................................. 29/748-750, 29/752-754, 759, 857, 861, 865, 866

[56] References Cited

U.S. PATENT DOCUMENTS

| | | | |
|---|---|---|---|
| 3,157,721 | 11/1964 | Barish | 29/759 |
| 3,758,935 | 9/1973 | Long et al. | 29/566.4 |
| 4,210,999 | 7/1980 | Smith | 29/857 |
| 4,766,668 | 8/1988 | Urness | 29/857 |
| 4,796,358 | 1/1989 | Long, Jr. et al. | 29/861 |

*Primary Examiner*—P. W. Echols

*Attorney, Agent, or Firm*—Adrian J. LaRue; Bruce J. Wolstoncroft

[57] ABSTRACT

A cable-making apparatus comprises a conductor-positioning device (110) to which an electrical cable (10) is affixed and exposed ends of electrical conductors (13) of the cable (10) are positioned in spaces (112) of a first comb member (**110*a*), a conductor-moving member (141) moves the conductors (13) from the first comb member (110*a*) into spaces (132) of a second comb member (130) so that the conductors (13) are aligned with termination sections (21*a*) of electrical contacts (21) of an electrical connector (20) positioned in a connector-retaining member (150) adjacent the second comb member (130), and a cutting and stuffer member (162) cuts the conductors (13) and stuffs them into the termination sections (21*a*) of the contacts (21) thereby effecting electrical connections between the conductors and the contacts whereafter the cable and connector terminated thereto are removed from the conductor-positioning device (110**).

12 Claims, 6 Drawing Sheets

METHOD AND APPARATUS FOR MAKING A HARNESS

FIELD OF THE INVENTION

The present invention relates to an apparatus for making electrical cable assemblies by automatically connecting electrical conductors to electrical contacts of an electrical connector and a method for making such electrical cable assemblies.

BACKGROUND OF THE INVENTION

Electrical harnesses or cable assemblies include electrical cables having ends of electrical conductors thereof electrically connected to electrical contacts of electrical connectors. The electrical connectors are electrically connected to respective electrical connectors of other cable assemblies or to printed circuit board connectors to interconnect electrical circuits. A variety of devices have been used to make these cable assemblies. A known device is disclosed in Japanese Publication No. 55-25712 which is directed to a manually-operated tool that presses electrical conductors of an electrical cable into a large number of termination sections of electrical contacts of an electrical connector. Such a cable and tool are shown in FIGS. 5–7B.

Cable 10 is of conventional construction and, as shown in cross section of FIG. 5, includes a large number of electrical conductors 13 contained within an insulated jacket 14. Each conductor 13 includes an electrical core 11 of solid wire or stranded wires surrounded by an insulation sheath 12.

FIG. 6A shows a conventional electrical connector 20 having a large number of electrical contacts 21 secured in a dielectric housing **20*a* in rows in accordance with prescribed spacing requirements. U-shaped termination sections 21*a* of each row of contacts 21 face outwardly at a rear section of housing 20*a* and have Y-shaped termination slots 21*b*, as shown in FIG. 6B, in leg sections of the U-shaped termination sections 21*a* with the upper parts of the Y-shaped slots 21*b* being a continuation of the opening in the bight section. Electrical conductors 13 are terminated in termination sections 21*a* by being pressed into Y-shaped slots 21*b* so that when conductors 13 are forced into the bottom narrowed sections of slots 21*b*, the opposing edges of these bottom narrowed sections will displace the insulation of the conductors 13 and electrically engage the conductive cores thereof thereby forming electrical connections between contacts 21 and conductors 13**.

Tool 30 for mass terminating conductors 13 of cable 10 to the electrical contacts 21 of electrical connector 20 is shown in FIG. 7A. Tool 30 has a block member **30*a* which includes a retaining section 31 in which connector 20 is retained. Comb members 32 are pivotally mounted at one end to the block member 30*a* below the retaining section 31. Comb members 32 have elongated openings and aligned teeth along each side of the opening. The spaces between the teeth of comb members 32 receive the ends of conductors 13 and the spacing between these spaces corresponds to the spacing of contacts 21 of connector 20. The elongated openings in comb members 32 are in alignment with the termination sections 21*a* of contacts 21 when connector 20 is retained in retaining section 31. Arms 34 are pivotally mounted at inner ends to block member 30*a* and a conductor-stuffing and cutting block 33 is secured to each arm 34**.

To operate tool 30, connector 20 is retained in retaining section 31 by retaining plates **31*a* on block member 30*a*. Conductors 13 are positioned in respective spaces between the teeth of comb members 32, after which comb members 32 are moved in the direction of arrows A initially positioning conductors 13 in alignment with respective terminating slots 21*b* of terminating sections 21*a* of contacts 21. Arms 34 then moved in the direction of arrows B causing conductor-stuffing and cutting blocks 33 to move into the elongated openings of comb members 32 with projections 33*a*, 33*b*, 33*c* at the front surfaces of comb members 32 forcing or pressing conductors 13 into terminating slots 21*b* of terminating sections 21*a* and simultaneously edges 33*d* of projections 33*a* and edges 31*b* of retaining plates 31*a* cut the conductors 13 thereby resulting in electrical connections of the conductors 13 to respective contacts 21**.

The use of manual tools as described above to make cable assemblies results in high production costs and inferior manufacturing efficiency due to the large number of conductors having to be manually placed within the combs and to verify proper positioning therein. When production of the cable assemblies was increased, errors occurred when conductors were terminated to wrong contacts.

It is an object of the present invention to provide a cable-making apparatus and method that overcomes the manually-operated tool thereby substantially upgrading the cable-manufacturing efficiency and reducing the wrongful placing of conductors in position for termination to the contacts.

SUMMARY OF THE INVENTION

According to the present invention, a cable-making apparatus comprises a conductor-positioning device to which an electrical cable is affixed and exposed ends of electrical conductors of the cable are positioned in spaces of a first comb member, a conductor-moving member moves the conductors from the first comb member into spaces of a second comb member so that the conductors are in alignment with termination sections of electrical contacts of an electrical connector positioned and retained in a connector-retaining member adjacent the second comb member, and a cutting and stuffer member cuts the conductors and stuffs them into the termination sections of the contacts thereby effecting electrical connections between the conductors and the contacts whereafter the cable and connector terminated thereto are removed from the conductor-positioning device.

The present invention is also directed to a method of making cable assemblies that includes the steps of positioning electrical conductors of an electrical cable in spaces of a first comb member, moving the electrical conductors from the first comb member to spaces of a second comb member so that the conductors are in alignment with termination sections of electrical contacts of an electrical connector disposed adjacent to the second comb member, cutting the electrical conductors, and terminating the electrical conductors to the termination sections thereby effecting electrical connections between the conductors and the contacts.

BRIEF DESCRIPTION OF THE DRAWINGS

The invention will now be described by way of example with reference to the detailed specification and the accompanying drawings.

DETAILED DESCRIPTION OF THE INVENTION

Figure 1A:
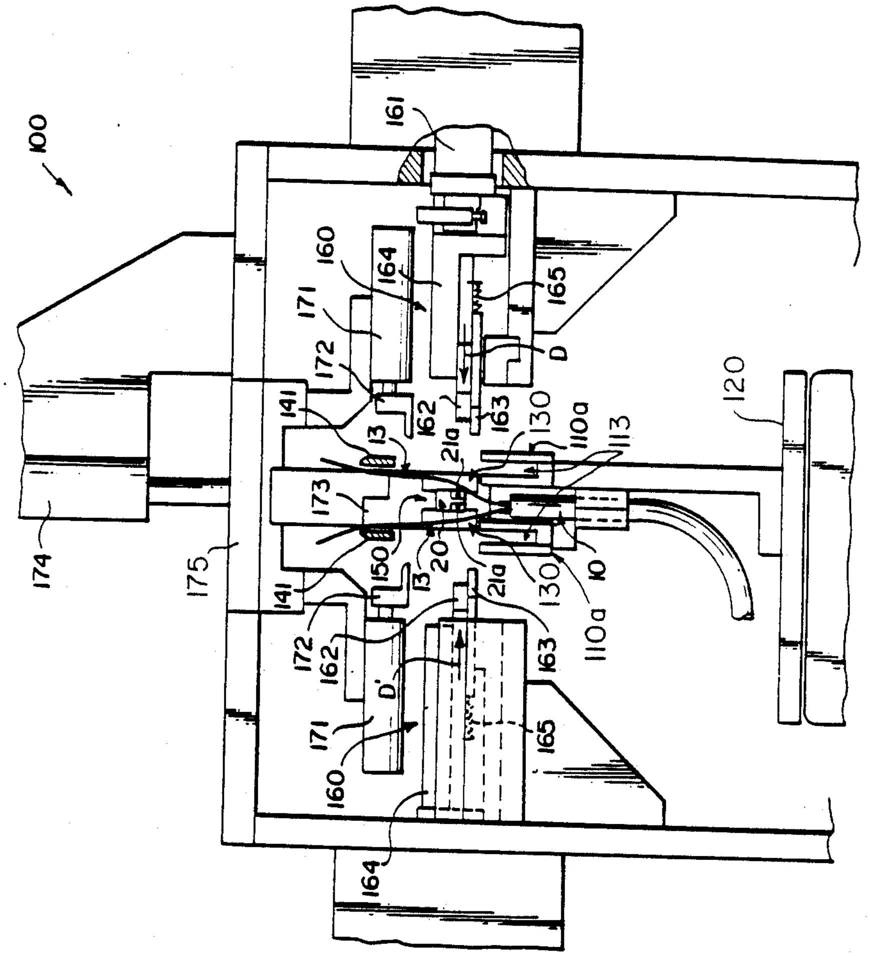
FIG. 1A is a front elevational view of the cable-making apparatus of the present invention.
Figure 2:
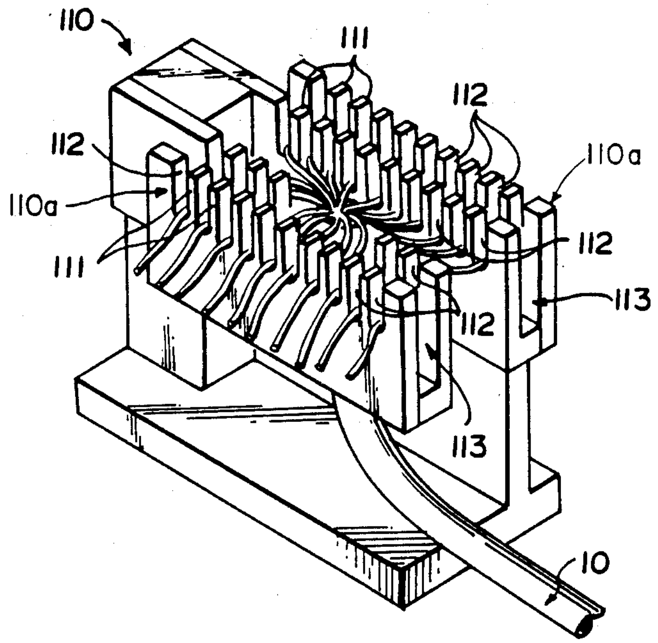
FIG. 2 is a perspective-view of the comb members with electrical conductors of an electrical cable positioned in spaces between the teeth thereof.

A conductor-positioning device 110 is shown in FIG. 2 which includes a base and a pedestal thereon to which are mounted spaced comb members 110*a*, each being U-shaped and having aligned teeth 111 separated by spaces 112. An elongated channel 113 extends along each comb member 110*a*. Cable 10 having ends of electrical conductors 13 exposed is mounted onto the pedestal of conductor-positioning device 110, as shown in FIG. 1A, with conductors 13 being positioned within respective spaces 112 so that conductors 13 extend outwardly from comb members 110*a*, as shown in FIG. 2.

Figure 3:
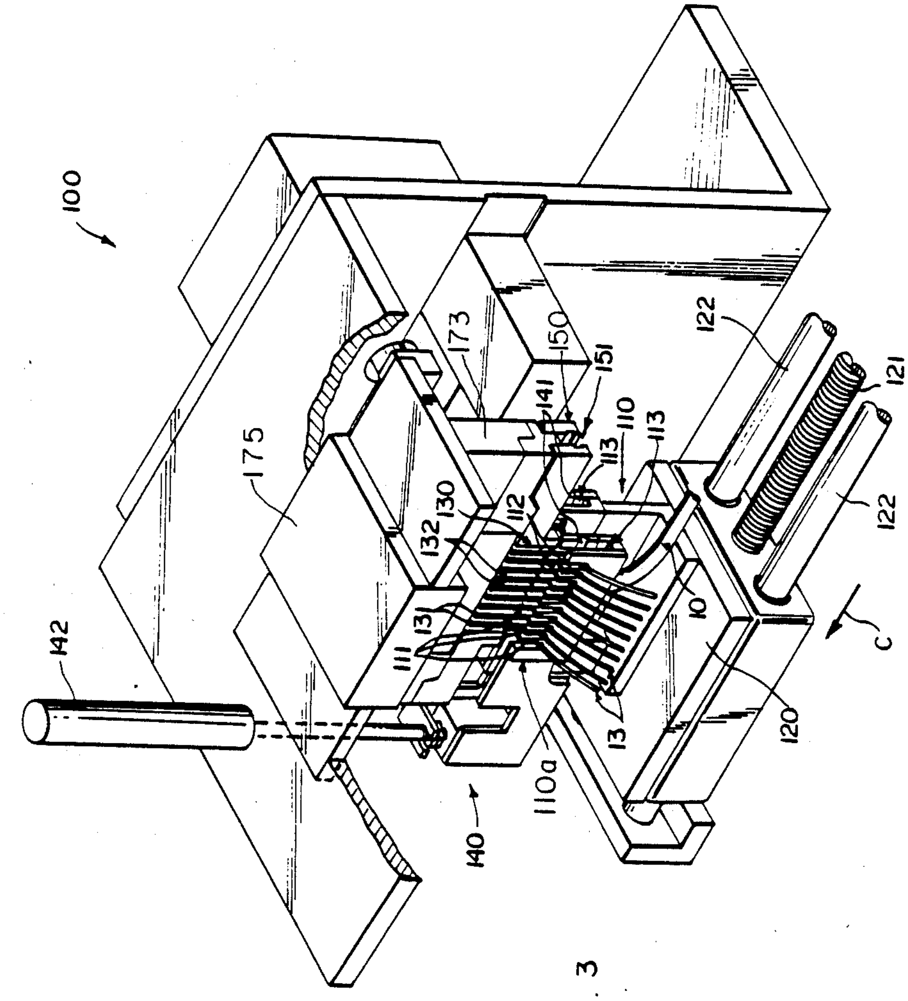
FIG. 3 is a perspective view partly in section of the apparatus of FIG. 1 showing the conductors prior to being moved upwardly.
Figure 4:
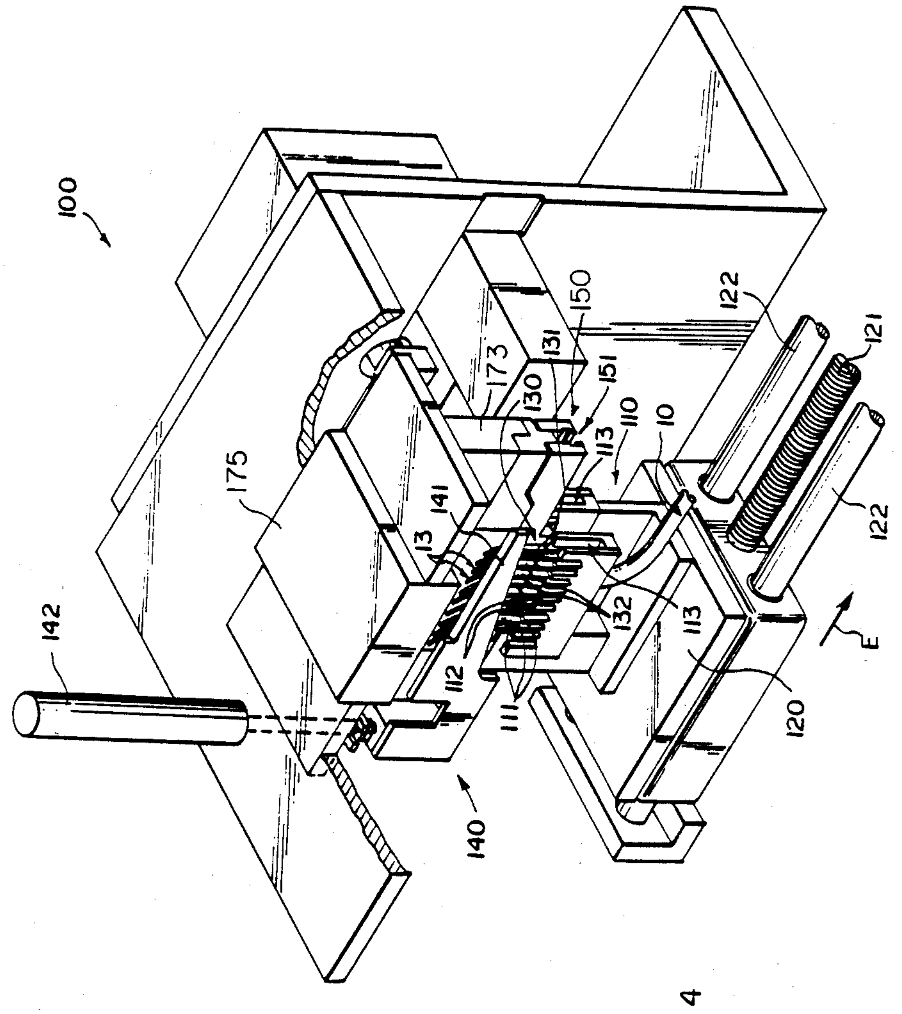
FIG. 4 is a view similar to FIG. 3 showing the conductors in an upper position.
Figure 5:
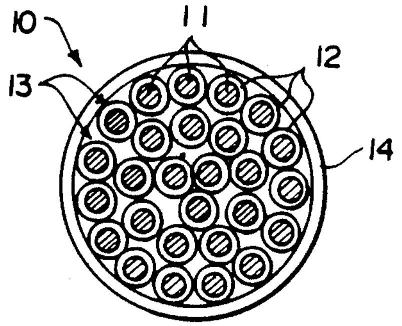
FIG. 5 is a cross section of a conventional electrical cable.
Figure 6A:
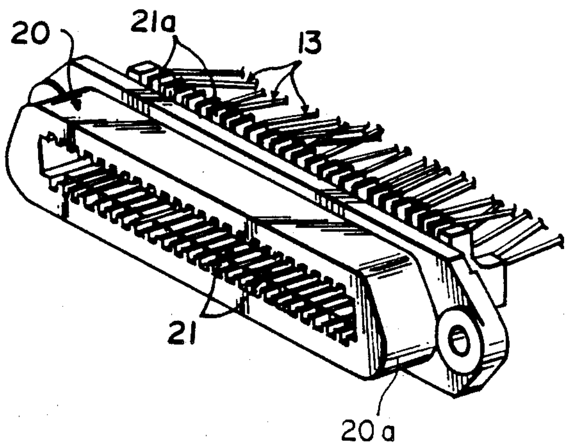
FIG. 6A is a perspective view of a conventional electrical connector with electrical conductors terminated thereto.
Figure 6B:
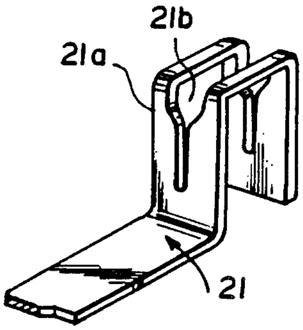
FIG. 6B is a part perspective view showing a termination section of an electrical contact of the connector.
Figure 7A:
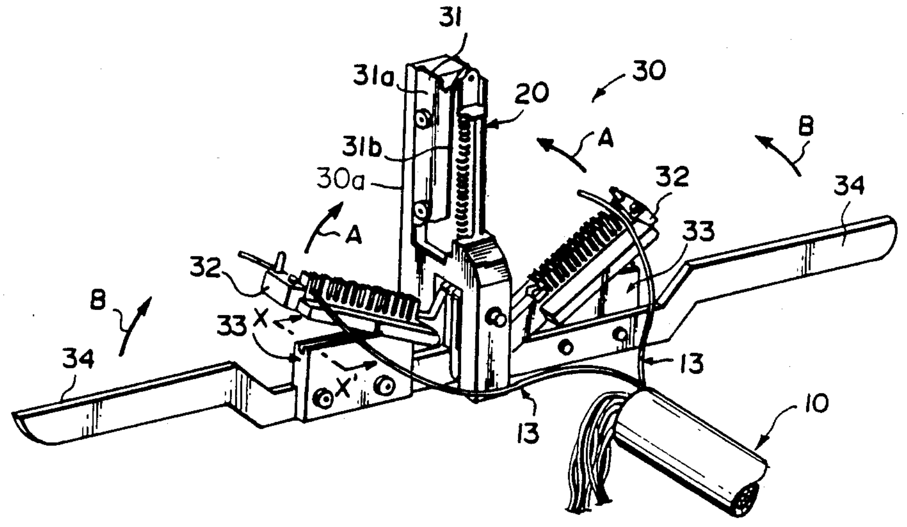
FIG. 7A is a perspective view of a manually-operated prior art tool in which the connector of FIG. 6A is held and electrical conductors of the cable of FIG. 5 are in position in the tool prior to being terminated to the contacts of the connector.
Figure 7B:
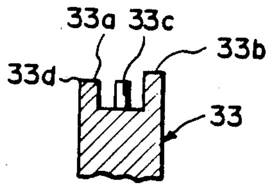
FIG. 7B is a cross-sectional view taken along line x—x in FIG. 7A showing the cutting block.

Conductor-positioning device 110 with cable 10 secured thereto and conductors 13 positioned in spaces 112 of comb members 110*a* is mounted on a movable table 120 of cable-making apparatus 100 which is moved along guide rods 122 in the direction of arrow C via a drive screw 121 that is driven by a reversible motor (not shown) until conductor-positioning device 110 reaches the position shown in FIG. 3. At this position, conductor-moving members 141 are disposed in channels 113 below conductors 13. Comb members 130 on each other surface of connector-retaining member 150 have teeth 131 and spaces 132 in alignment with the inner teeth 111 and spaces 112 of comb members 110*a*. Spaces 132 of comb members 130 are in alignment with slots 21*b* in termination sections 21*a* of contacts 21 when connector 20 is positioned in channel 151 of connector-retaining member 150.

After conductor-positioning device 110 has been positioned relative to comb members 130, as shown in FIG. 3, and connector 20 has been positioned in channel 151 of connector-retaining member 150, cylinder 142 is operated to move the piston thereof upwardly which is connected to conductor-moving members 141 thereby moving them upwardly so that members 141 move conductors 13 from spaces 112 of comb members 110*a* into spaces 132 of comb members 130 so as to be aligned with respective slots 21*b* of termination sections 21*a* of connector 20 as shown in FIG. 1A.

Figure 1B:
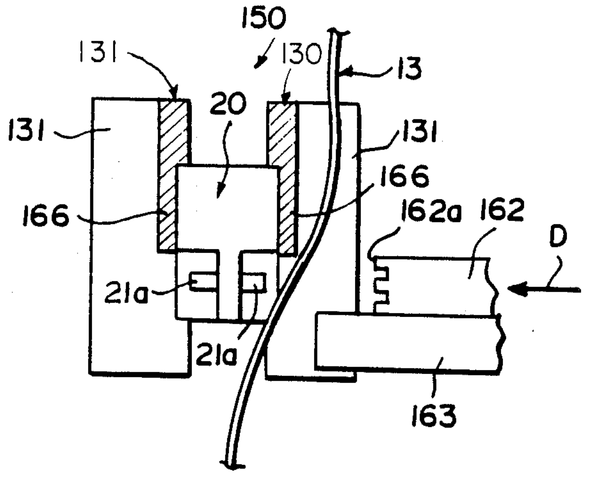
FIG. 1B is an enlarged front elevational view of a connector-retaining section and part of the conductor-cutting and stuffer device of the apparatus of FIG. 1A.

A pair of opposing cylinders 161 of conductor-cutting and stuffer device 160 have the pistons thereof connected to block members 164 to which cutting and stuffer members 162 are mounted along with conductor pressing members 163 which are spring biased by springs 165. When cylinders 161 are operated, cutting and stuffer members 162 and pressing members 163 are moved in the directions of arrows D, D′ causing pressing-members 163 to initially engage conductors 13 pressing them further into spaces 132 of comb members 130 so a to be adjacent termination sections 21*a* of contacts 21 whereafter edges 162*a* of cutting and stuffer members 162 and the bottom outer edges of plates 166 of comb members 130, as shown in FIG. 1B, cut conductors 13 as cutting and stuffer members 162 move along the bottom surfaces of plate 166 and then stuff or press the ends of conductors 13 into slots 21*b* of termination sections 21*a* of contacts 21 thereby effecting electrical connections between conductors 13 and contacts 21.

During the operation of cutting and stuffer members 162 and pressing members 163, cylinders 171, as shown in FIG. 1A, are operated causing pistons thereof to which conductor-retaining members 172 are connected to move in the directions of arrows D, D′ and press the conductors 13 against respective sides of block members 173 just before cutting and stuffer members 162 cut conductors 13 so that the cut free ends of conductors 13 are retained in position against block member 173 and prevented from falling onto members 162 and conductor-positioning device 110 to prevent malfunctioning thereof.

Cylinder 174 has its piston connected to plate member 175, as shown in FIG. 1A, to which block member 173 and cylinders 171 are mounted and are moved upwardly when cylinder 174 is operated with members 172 retaining the cut free ends of conductors 13 against the sides of block member 173, cutting and stuffer members 162 and pressing-members 163 are returned to their original positions and drive screw 121 is operated thereby moving table 120 and conductor-positioning device 110 thereon on which cable 10 terminated to connector 20 is located in the direction of arrow E to a position at which connector 20 and cable 10 can be removed therefrom. Conductor-retaining members 172 are then moved to their original positions permitting the cut free ends of conductors 13 to fall and plate members 175 and block member 173 return to their original position.

Cable-making apparatus 100 is now ready to terminate the other end of cable 10 in like manner and to make another and other cable assemblies continuously by using a number of conductor-positioning devices to which cables have been mounted and their conductors properly positioned ready for use in the cable-making apparatus.

A method and apparatus for making cable assemblies have been disclosed to prevent the conductors of a cable from being wrongly positioned by positioning the conductors in a conductor-positioning device, moving the conductors from the conductor-positioning device to a position adjacent termination sections of electrical contacts in an electrical connector and cutting and stuffing the conductors into the termination sections thereby effecting electrical connections between the conductors and contacts. The cable assemblies can be manufactured continuously one after another by the use of a number of conductor-positioning devices thereby upgrading the cable-making efficiency and decreasing production costs.

I claim:

1. An electrical cable-making apparatus, comprising: conductor-positioning means onto which an electrical cable is affixed and having first comb means including first spaces into which exposed ends of electrical conductors of the cable are disposed;

second comb means alignable opposite said first comb means and having second spaces in alignment with said first spaces of said first comb means when the first and second comb means are positioned opposite one another;

connector-retaining means for retaining an electrical connector having electrical contacts provided with termination sections and being positioned adjacent said second comb means with the contact termination sections being aligned with said second spaces;

conductor-moving means positioned along said first comb means and being movable from a first position to a second position whereby during such movement moving the conductors from the first spaces of the first comb means to the second spaces of the second comb means so that the conductors are aligned with the contact termination sections;

cutting means for cutting the conductors; and means for terminating the conductors into the contact termination sections thereby effecting electrical connections between the conductors and the contacts.

2. An electrical cable-making apparatus as claimed in claim 1, wherein said conductor-positioning means is mounted onto movable table means for moving said conductor-positioning means so that said first comb means is positioned opposite said second comb means with the first and second spaces of the first and second comb means being aligned.

3. An electrical cable-making apparatus as claimed in claim 1, wherein said cutting and terminating means constitute an integral cutting and stuffer member.

4. An electrical cable-making apparatus as claimed in claim 3, wherein said cutting and stuffer member and a plate of said second comb means form said cutting means.

5. An electrical cable-making apparatus as claimed in claim 3, wherein a spring-biased pressing means is part of the cutting and stuffer member for pressing the conductors adjacent the contact termination sections prior to the conductors being cut and terminated in the contact termination sections.

6. An electrical cable-making apparatus as claimed in claim 1, wherein said first comb means is U-shaped defining a channel along which said conductor-moving means is positioned at said first position.

7. An electrical cable making apparatus as claimed in claim 1, wherein conductor-retaining means engages outer ends of the conductors and presses them against a section of said connector-retaining means thereby retaining the cut free ends of the conductors during the termination of the conductors to the contact termination sections.

8. A method of making electrical cable assemblies comprising the steps of:

positioning electrical conductors of an electrical cable in first spaces of a first comb member;

moving the conductors from the first spaces of the first comb member to second spaces of a second comb member that are aligned with the first spaces and also align the conductors with termination sections of electrical contacts of an electrical connector, the conductors being moved by a conductor moving means positioned proximate the first comb member, the conductor moving means being movable between a first position and a second position;

cutting the electrical conductors; and terminating the conductors in the contact termination sections thereby effecting electrical connections between the conductors and the contacts.

9. A method as claimed in claim 8, wherein the steps of cutting and terminating the conductors are performed at the same time.

10. A method as claimed in claim 8, comprising the further step of placing the first comb member with the electrical cable affixed thereto and the conductors in the first spaces thereof onto a movable table;

and moving the movable table until the first comb member is positioned opposite the second comb member with the first and second spaces of the first and second comb members in alignment.

11. A method as claimed in claim 9, comprising the additional step of pressing the conductors into the second spaces adjacent the contact termination sections prior to the cutting and terminating of the conductors.

12. A method as claimed in claim 8, comprising the further step of retaining the outer ends of the conductors prior to the cutting and terminating of the conductors so that the cut free ends of the conductors are retained.

* * * * *